United States Patent [19]

Makinson

[11] 4,201,744
[45] May 6, 1980

[54] METHOD OF MAKING TIRES

[75] Inventor: Charles L. Makinson, Akron, Ohio

[73] Assignee: The Goodyear Tire & Rubber Company, Akron, Ohio

[21] Appl. No.: 921,925

[22] Filed: Jul. 3, 1978

[51] Int. Cl.$^2$ .................. B29H 5/02; B29H 17/38
[52] U.S. Cl. .................................. 264/250; 156/125; 264/263; 264/273; 264/315
[58] Field of Search .............. 264/250, 263, 273, 315, 264/326; 156/125; 152/187, 209 R, 325, 327, 328, 331, 333, 357 A, 374

[56] References Cited

U.S. PATENT DOCUMENTS

| | | | |
|---|---|---|---|
| 2,345,068 | 3/1944 | Pfeiffer | 152/327 X |
| 2,612,461 | 9/1952 | Hallgren | 152/331 X |
| 2,724,425 | 11/1955 | Ostling | 156/125 |
| 2,744,290 | 5/1956 | Corson | 264/326 X |
| 3,354,249 | 11/1967 | Morin | 264/273 X |
| 3,833,043 | 9/1974 | Watanabe et al. | 152/357 A |
| 3,888,291 | 6/1975 | Herzlich et al. | 152/357 A X |
| 4,071,070 | 1/1978 | Schmidt | 152/328 X |

FOREIGN PATENT DOCUMENTS 1215242  4/1960  France .................................. 264/273

*Primary Examiner*—Jan H. Silbaugh
*Attorney, Agent, or Firm*—D. M. Ronyak

[57] ABSTRACT

A tire prepared by molding in one or more first molds of at least two separate annular tire body parts of an elastomer composition and stabilizing same, a set of said tire body parts forming a complete tire body exclusive of tread, transferring said parts to a second annular mold which positions them in the same relationship to one another that they will have in the completed tire and introducing into said second mold a predetermined quantity of an elastomer composition to join said parts and form an annular tread about the crown thereof.

10 Claims, 6 Drawing Figures

METHOD OF MAKING TIRES

BACKGROUND OF THE INVENTION

The present invention relates to vehicle tires and a method of manufacturing vehicle tires.

A majority of tires for vehicles, e.g. automobiles, trucks, tractors, aircraft, and the like, are constructed on a rotatable building drum by applying a plurality of strips of rubber or rubberized material sequentially, during the course of which a rigid ring or bead is applied to each edge of the tire so that when the tire is inflated on a rim the beads tightly engage the rim at all times.

It has long been considered highly desirable to develop a method of forming tires for vehicles without the use of a laborious and expensive assembly process. Several processes have been proposed for the manufacture of tires from elastomeric resins by casting, molding, and variations thereof. These methods have included rotationally casting a complete tire in a single mold having a segmented core, molding identical tire halves and later joining them by adhesion, welding, or mechanical means, and a variation of the latter process wherein a vulcanizable rubber tread is bonded to a tire casing preformed from a segmented thermoplastic copolyester elastomer.

These prior art methods have proven unsatisfactory. Either the process is too complicated or uneconomical, or the tire produced thereby does not satisfy tire performance standards. It is, therefore, desirable that a process be found which is simple, economical and capable of forming tires which satisfy the performance standards.

Pneumatic tires derive their load-carrying capabilities from their inflation pressure. Their vulnerability through loss of inflation pressure has long been a drawback. As a result, non-pneumatic and semi-pneumatic tires whose load-bearing, riding, and handling properties resemble those of conventional pneumatic tires, have been prepared by the proper selection of an elastomer material and the use of complicated internal support structures formed integrally with the tire. Such internal structures may contain a plurality of separate generally radially extending webs spaced about the circumferential direction of the tire. It would be desirable to find a tire manufacturing process which would be particularly adaptable to the production of such non-pneumatic tires.

An object of the present invention is to provide a simple, inexpensive process for the manufacture of tires said process being capable of being totally automated.

Another object is to provide a tire by such a process.

Other objects will become apparent as the description proceeds.

SUMMARY OF THE INVENTION

According to the present invention, a tire is manufactured by molding in one or more first-stage molds at least two separate annular parts which can be arranged to form the body of the tire, transferring said parts to a second-stage and mold which positions said parts in the location they will have in the completed tire, said parts and said mold defining a tread cavity, and introducing a predetermined quantity of an elastomer composition into said cavity to join said tire body parts and to form a tread thereon. The tire body parts have holes formed therethrough which are utilized as vents for the tread cavity during introduction of the tread-forming elastomer.

"Tire body" as used herein means all portions of the tire under consideration excepting its tread. Conventional tires usually are generally toric-shaped with a horse-shoe shaped radial cross-section. Tires manufactured according to the invention may be of conventional appearance and include sidewalls or may be manufactured without sidewalls if they contain an intermediate load-carrying and cushioning structure. Support of the tire body during introduction of the tread-forming elastomer composition can be provided in the case of a pneumatic tire having sidewalls, a hollow interior, and no internal structure by an inflatable bladder filled with an incompressible fluid or other means. Where the tire is one which has an intermediate load-carrying and cushioning structure, such structure provides support for the tread-receiving area of the body during introduction of the tread-forming elastomer composition in the second-stage mold and no other support means is necessary.

Injection molding is preferred but transfer molding or rotational casting may be employed in both the first and second steps.

DETAILED DESCRIPTION

The drawings herein are intended to illustrate and not limit the present invention.

Figure 1:
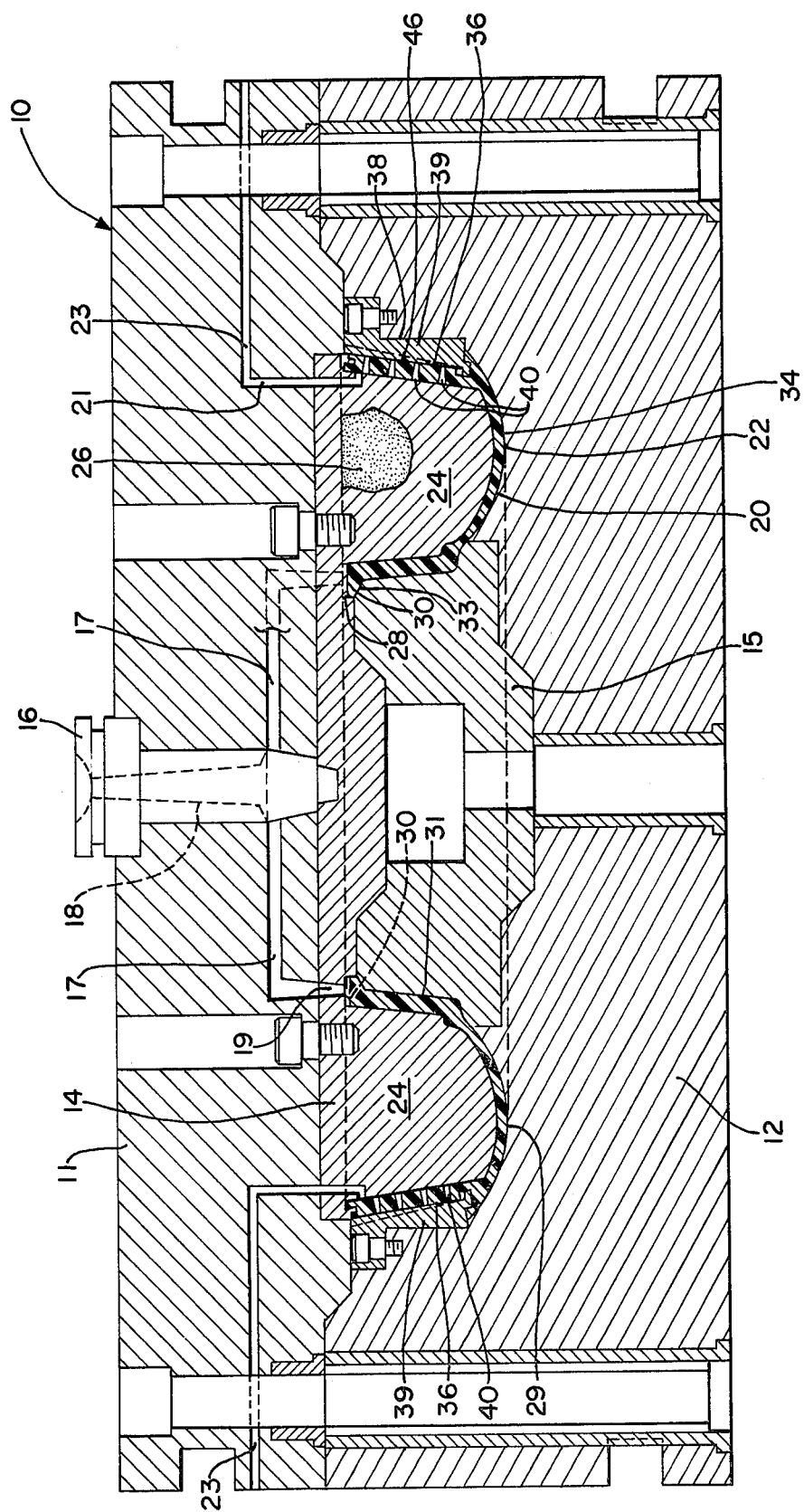
FIG. 1 is an axial cross-sectional view of a tire body half made in accordance to the present invention shown in the first mold injection stage.
Figure 4:
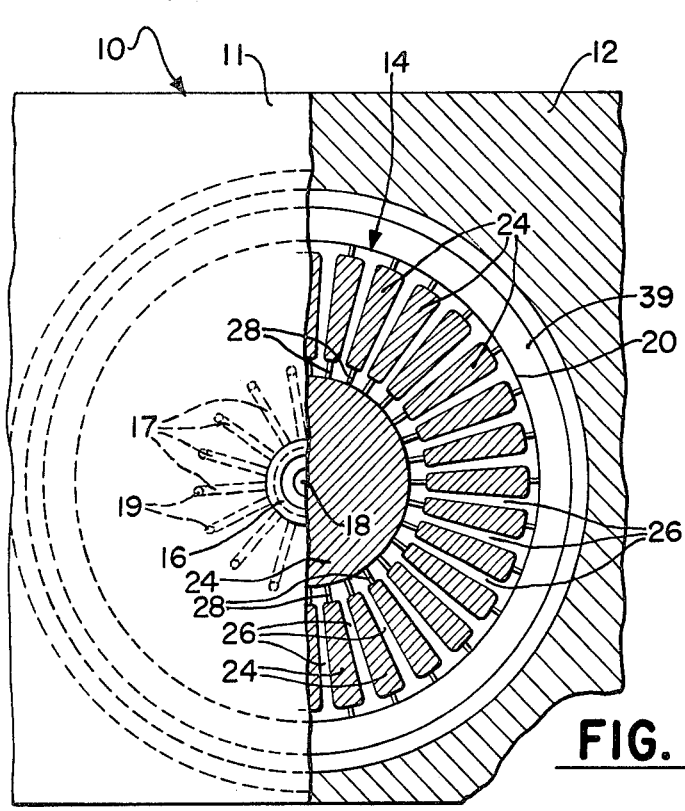
FIG. 4 is a plan view of a mold utilized in the first injection stage to form a tire body half; the mold being partially broken away to illustrate the internal mold cavity.

Referring now to FIGS. 1 and 4 for an illustration of the principles of the invention, a first-stage injection mold 10 has a first platen 11, a second platen 12, a core 14, and an extractor 15. The core member 14 is attached to first platen 11. Inserted into first platen 11 is sprue bushing 16 containing feed port 18 for delivery of the elastomeric material via feed runners 17,19 in the first platen 11 and core 14, respectively, into the cavity 20. Venting of mold cavity 20 is achieved through axial passages 21 which connect with radial passages 23. In the embodiment shown, annular mold cavity 20 is in the configuration of an annular tire body 22 (see also FIG. 6) divided by a plane passing through its circumferential centerline perpendicular to its axis of rotation. Both halves of a tire body can be made in the single first-stage and mold 10.

Referring now to FIG. 4, mold core 14 has a plurality of generally radially oriented lobes 24 which are circumferentially spaced apart substantially equidistant from one another and equidistant from the axis of rotation of the mold. Core 14 is an example of one used to form tire bodies having sidewalls and internal load-supporting structures. Tire bodies formed by a mold core 14 similar to that illustrated in FIG. 4 may have a plurality of generally radially oriented webs 26 (FIGS. 1, 2, 4, and 6) which are circumferentially spaced apart from one another substantially equidistantly about and from the axis of rotation of the tire body. It is understood that mold core 14 may have projections and recesses of a differing configuration to obtain tire body parts having internal load-supporting structures differing from those illustrated. Should it be desired to form a tire body having internal load-supporting structure but without sidewalls, lobes 24 would extend axially to contact second platen 12 (FIG. 1). If tires without internal load-supporting structures are to be made, mold core 14 would not have lobes 24 and would present a continuous curved surface (not shown) to cavity 20.

Mold core 14 has a plurality of radially oriented ribs 28 which connect the inner diameter of cavity 20 to lobes 24. Each of these ribs 28 results in a vent 30 being molded into the base 31 of the tire body part 29. Mold cavity 20 defines base 31, sidewall 34, and crown 36 of tire body part 29. The base or rim-contacting portion 31 preferably includes an annular configured lip, e.g. one-half a dovetail 33, so that when two tire body halves (42,43 in FIG. 2) are joined there will be formed at their circumferential centerline in their base portion means for positioning the tire body parts with their axes of rotation congruent in a ring clamp having a complimentary groove such as in the second-stage mold 100 (FIG. 2) and/or a vehicle rim (not shown). The crown portion 38 of second platen 12 of the first-stage mold 10 is provided with mold ring 39 which contains a plurality of pins 40 which pass through in a substantially radial direction with respect to mold cavity 20 to contact core 14. As shown in FIG. 1, pins 40 preferably achieve their greatest cross-section at their radially inward extremity resulting in a tapered configuration and are circular in axial cross-section. In other words, each pin 40 is in the shape of a frustum of a right circular cone. This shape is preferred to maximize the mechanical holding power of the holes 44 (FIG. 2) which are formed by pins 40 in the crown of the tire body, although cylindrical pins or pins of differing configuration may be used to form such holes or slots for venting of the tread cavity 108 (FIG. 2) of the second-stage mold 100.

Figure 2:
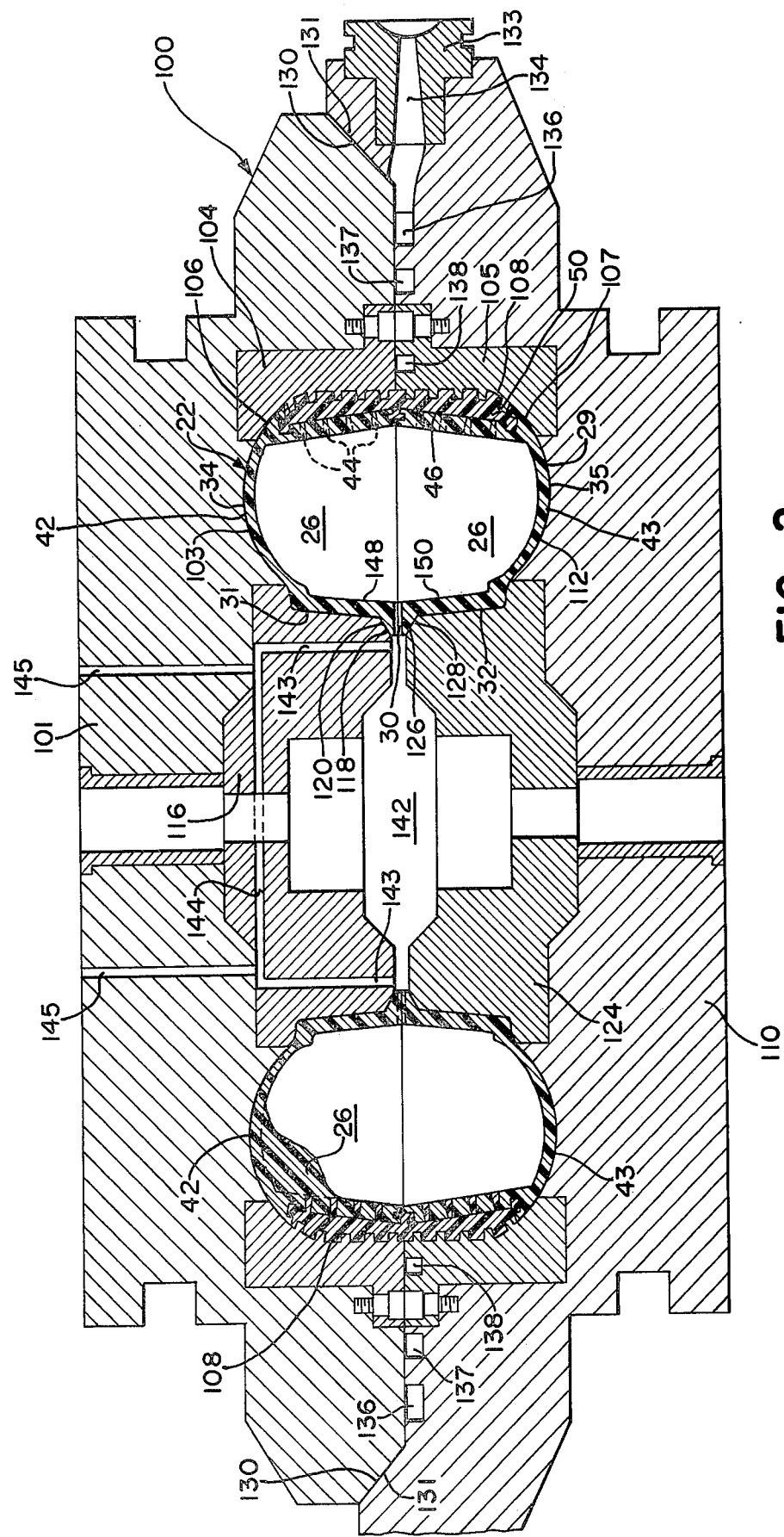
FIG. 2 is an axial cross-sectional view of a complete tire made in accordance with the present invention shown in the second mold injection stage.
Figure 3:
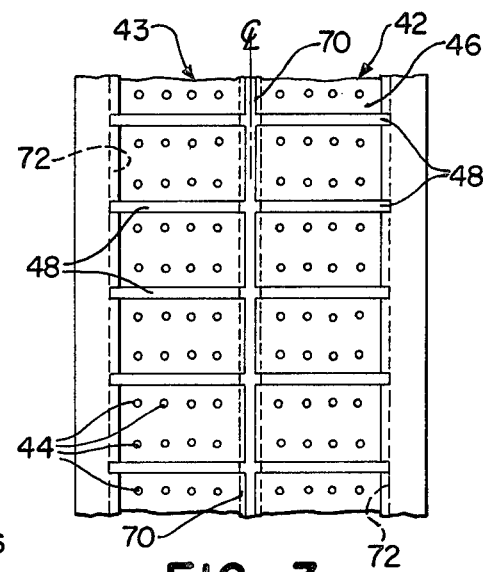
FIG. 3 is a plan view of a portion of the tread receiving surface of an assembled tire body made during the first mold injection stage.

The arrangement of pins 40 is further elucidated in FIG. 3 in the resulting tire body comprised of two halves 42,43 joined together in a circumferential direction. Pins 40 (FIG. 1) cause holes 44 to be formed in the crown of the tire body which are spaced apart from one another over the entire crown portion of the tire body. Although in FIG. 3, the holes 44 are shown to be aligned in both axial and circumferential rows, this need not be the case. The tread-receiving surface 46 of the crown is preferably not smooth and continuous but rather includes first regions which are closer to the axis of rotation and second regions which are farther from the axis of rotation of the tire. For example, the tread-receiving surface 46 of the crown 36 may be provided with substantially axially oriented ribs 48 to prevent circumferential slippage of the tread 50 (FIGS. 2,6) when tractive forces are applied. In the embodiment shown (FIGS. 1, 3 and 6) ribs 48 linearly increase in height as they progress from the circumferential centerline to the axial extremity of the crown. First regions which are closer to the axis of rotation of the tire than ribs 48 decrease in radius from the axis of rotation of the tire from the circumferential centerline to the axial extremities of the crown. As a result, the crown of the tire body is not cylindrical but rather provides a configured surface whose area-averaged radius at the circumferential centerline is greater than its area-averaged radius at the axial extremity of the crown. Such configuration causes the tread of the tire to be self-centering. The crown of the tire body may additionally be provided with circumferentially oriented lugs 70 or recesses 72 (FIGS. 2,6) to further mechanically secure the tread against lateral movement during operation of the completed tire.

Tire body part 29 is formed by introduction of a sufficient quantity of elastomer composition into cavity 20 of first-stage mold 10. Any elastomer composition suitable for molding of tires may be employed. Preferable compositions are those designed for injection molding. Such compositions are well known in the art of molding of tires.

After the tire body part 29 is formed in cavity 20 of the first-stage mold 10, it is stabilized to enable its removal. If formed of a vulcanizable elastomer composition, it is vulcanized sufficiently to permit removal, but not so much as to prevent bonding by co-vulcanization with the tread 50. If formed of a thermoplastic elastomer composition the mold is cooled to a temperature sufficient to solidify the tire body part.

Referring now to FIG. 2, two identical tire body parts 42,43 are positioned within a second-stage mold 100. Second-stage mold 100 includes a first member 101 including surface 103 for receiving a first sidewall 34 of tire body 22. A first tread ring 104 for receiving a first shoulder 106 of the tire body 22 is affixed to first member 101. Tread ring 104 defines one-half of the tread-forming cavity 108. Second-stage mold 100 additionally includes second member 110 which is axially opposed to first member 101, said second member including surface 112 for receiving the second and opposite sidewall 35 of said tire body 22. A second tread ring 105 affixed to second member 110 is provided for receiving the opposite shoulder 107 of said tire body. Tread ring 105 defines the remainder of tread-forming cavity 108. Third member 116 is provided for receiving the base 31 of one-half of said tire body 22. Third member 116 includes surface 118 which engages lip 120 near the circumferential centerline of the assembled tire body. Fourth member 124 is provided for receiving the base 32 of the other tire body half 43. Fourth member 124 includes surface 126 which engages lip 128 near the circumferential centerline of the assembled tire body. If the tire being formed has internal load-supporting structure but no sidewalls (not shown) surfaces 103 and 112 would be appropriately modified to laterally support the internal structure.

After placement of the tire body halves 42,43 into the second-stage mold 100, members 101 and 110 are moved axially toward one another until they positively engage. Conical surface 130 of first member 101 and conical surface 131 of second member 110 mate to align first member and second member. In this closed position, the sidewalls 34,35 and base portions 31,32 of the tire body halves 42,43 are fully supported on their external surfaces. The load-supporting webs 26 within the tire body halves 42,43 support the tread-receiving surface 46 against radially inward displacement.

Figure 5:
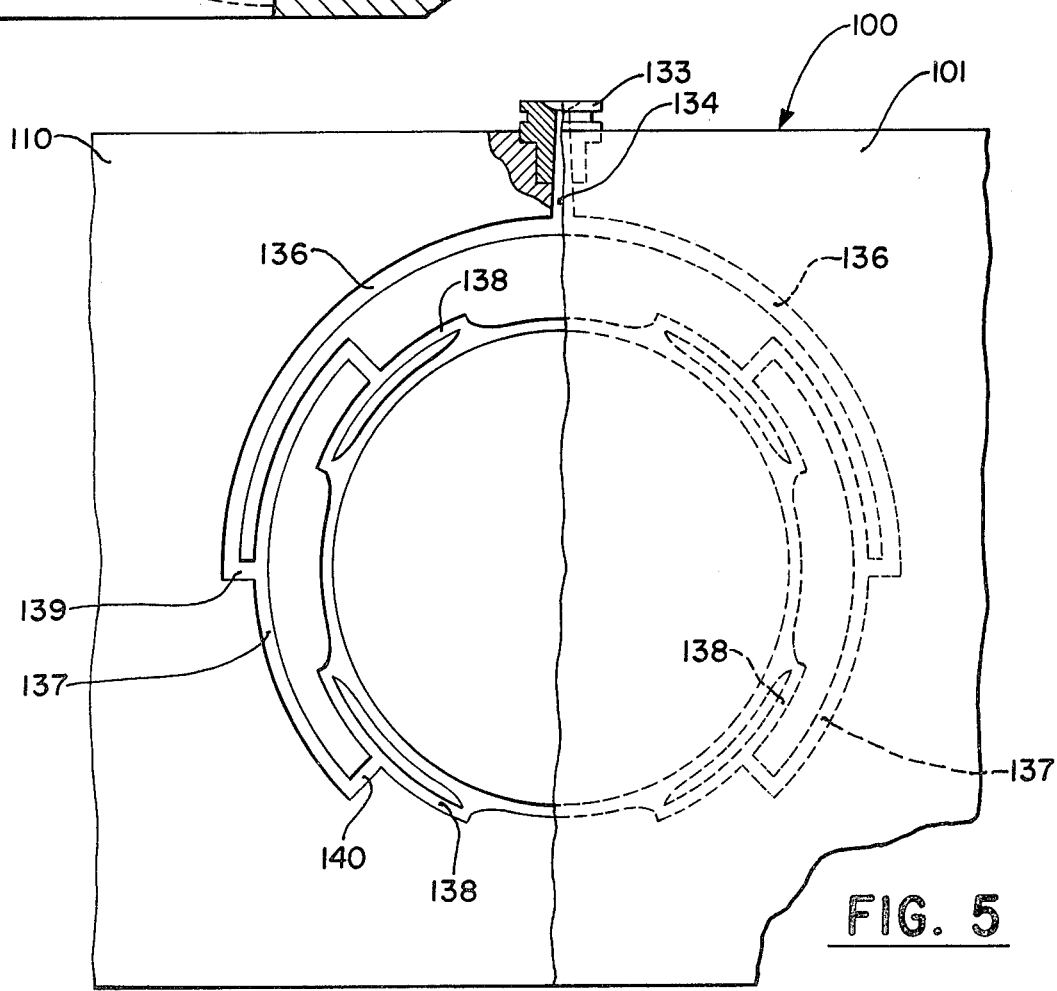
FIG. 5 is a plan view of a second-stage injection mold partially broken away to show a balanced circumferential runner system for delivery of elastomer to the tread cavity.

Referring to FIG. 5, a predetermined amount of elastomer composition is introduced through feed port 134 in sprue bushing 133 and passes through arcuate circumferential runners 136,137,138 and their interconnecting radial passages 139,140 and flows into tread-forming cavity 108 (FIG. 2) thereby uniting the tire body halves 42,43 into a single unit and forming an annular tread 50 thereon. Circumferential runners 136,137,138 are balanced so as to provide homogeneous flow to all parts of the tread cavity. "Homogeneous flow" as used herein means that all portions of elastomer in the tread cavity have been subjected to substantially identical rheological conditions; i.e. stress, strain, time and temperature. Non-homogeneous flow will result in some portions of the tread cavity being overfilled while other portions are underfilled. This will cause imbalance. Holes 44 in tire body halves 42,43 formed by pins 40 in the first-stage mold 10 are utilized as vents for the tread cavity 108 and as means for mechanically securing the tread to the tire body. Holes 30 (FIGS. 2,6) in the base 31,32 of the tire body halves 42,43 respectively vent the interior of the tire body 22 into the void 142 (FIG. 2) between the third member 116 and fourth member 124. Venting to the exterior of the mold is completed by axial tubes 143, which are in communication with annular groove 144, both of which are in third member 116, and axial vent tubes 145 in first member 101. The interior load-supporting structure, i.e. webs 26 (FIGS. 1,2,4,6) of the tire body halves 42,43 supports the crown 36 and prevents radially inward displacement or collapse of the crown during introduction of the tread-forming elastomer. The amount of tread-forming elastomer composition is predetermined such that it will fill tread-forming cavity 108 and holes 44 formed by pins 40 without excess. If the tire body parts 42,43 and tread 50 are formed of vulcanizable elastomer, vulcanization of the assembly is completed in the second-stage mold. The tire parts are at this time vulcanized to each other. If the tread is formed of a thermoplastic elastomer composition, the assembly is cooled to allow solidification to occur prior to opening of the second-stage mold and removal of the completed tire (FIG. 6) therefrom. Preferably in the latter case, the thermoplastic tread welds to the tire body upon solidification.

It is understood that the tread elastomer composition need not be the same composition as the elastomer composition used to form the tire body and, preferably, is of different composition due to differing requirements for these parts of the tire. Any elastomer composition suitable for use in tire treads and capable of being molded may be employed. Such compositions are well known in the art of the tire molding. Because of the topography of the crown 36 of the tire body 22, the tread is mechanically constrained should the elastomer composition chosen not form a bond.

Figure 6:
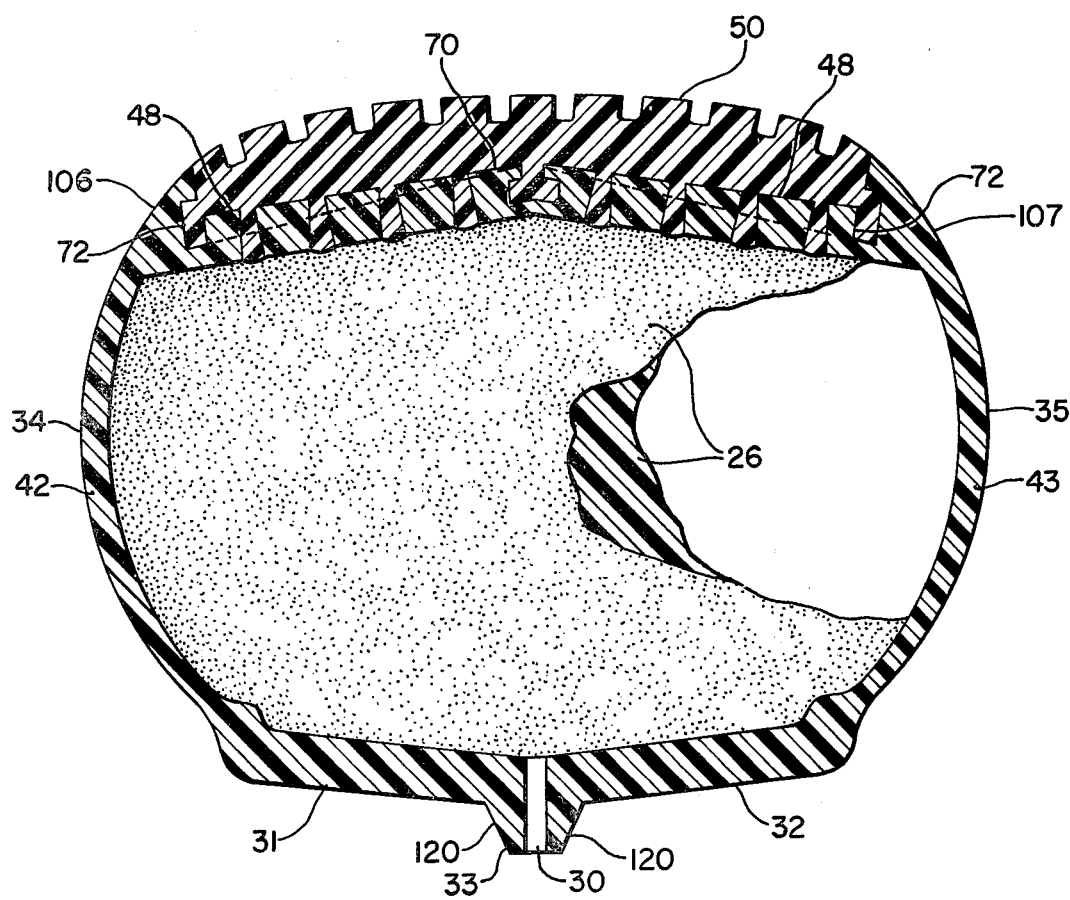
FIG. 6 is a radially taken cross-sectional view of a tire made according to the invention, with portions of the tire broken away to better illustrate internal features thereof.

Tires not having internal load-bearing structures may be manufactured according to the invention by forming tire body parts including sidewalls 34,35 but without axially inwardly extending parts 148,150 of base portions 31,32, respectively (FIGS. 2,6). In this case, third member 116 and fourth member 124 of the second-stage mold 100 would be of a different configuration (not shown) and a support (not shown) would be required to fill the interior of the tire body 22 and press sidewalls 34,35 against surfaces 103 and 112, respectively. Such support could be a solid core (not shown) formed of sections to permit later withdrawal from the completed tire or an inflatable bladder. Of these, a bladder is preferred. The bladder (not shown) should be provided with reinforcement to enable it to be inflated repeatedly with precision to a predetermined configuration, thus preventing displacement of the crown 36 of the tire body radially outward resulting in distortion of the tread-forming cavity 108. Such bladder should be inflated with an incompressible fluid, including by way of example, not by limitation, water, oil, or heat transfer fluid, to prevent its displacement radially inward upon introduction of the tread-forming elastomer composition. Additionally, the bladder should be provided with configured outer surfaces, e.g. ribbed, to enable communication of holes 44 in the crown of the tire body with the exterior of the second-stage mold 100.

A tire having a tread reinforcement (not shown) may be produced by positioning such reinforcement (not shown) in the second-stage mold 100 prior to introduction of the tread-forming elastomer composition. Tire body reinforcement (not shown) including beads may be provided by positioning such reinforcement in the first-stage mold prior to introduction of elastomer composition.

It is to be understood that the tire body need not be formed of only two parts or that when formed of two parts that these necessarily be identical. The tire body parts may be such that a first one is provided with projections (not shown) which mate with recesses molded into a second one of the tire body parts. For example, a first tire body part may be provided with a male screw thread (not shown) and a second tire body part may be provided with a mating female screw thread (not shown). Such projections and complementary recesses facilitate assembly of the tire body prior to entry into the second-stage mold and eliminate the need for aligning and clamping surfaces 118,126 of members 101,110, respectively, which engage with the tapered lips 120,128 on the split line internal diameter of the tire body. It is also to be understood that a single tire body part may be of a size less than that or greater than that of a tire divided into two equal parts by a plane passing through the axial centerline perpendicular to the axis of rotation of said tire.

It is understood that throughout the processes described herein, it is necessary to accurately control the temperatures of all parts of the apparatus. This may be achieved by provision of a multitude of heating/cooling elements which are not shown in the drawings. Such apparatus and techniques are well known in the art of tire molding and vulcanization.

"Radial plane of a tire" as used herein, unless otherwise defined, means a plane which passes through that tire and contains the axis of rotation of that tire.

Although the invention has been described in considerable detail in the foregoing, it is to be understood that such detail is solely for the purpose of illustration and that various changes and modifications will be apparent to those skilled in the art without departing from the invention.

I claim:

1. A method of making a tire comprising:
   A. molding two annular tire body parts, each in a first-stage mold having a core, said tire body parts each including a crown portion having a tread-receiving surface, a base portion, and a sidewall joining said crown portion and said base portion, said tire body parts each having integrally formed therewith a load-bearing structure intermediate its crown and its base, said structure having a plurality of webs formed by lobes of said core, said webs being spaced apart from one another in the circumferential direction of said tire, said webs extending in a direction generally parallel to the axis of rotation of said tire so that said lobes may be retracted from the molded part as a unit;

B. arranging said two annular tire body parts in a second-stage mold in the position they will have in the completed tire, forming a tire body having a tread-receiving surface, thereby defining a tread-shaped cavity between said tread-receiving surface of said tire body and said second-stage mold; and C. filling said tread-shaped cavity with an elastomer composition to join said parts and form an annular tread thereon.

2. The method of making a tire according to claim 1, wherein said tire body parts are identical, each forming half of a tire body, the mating edges of which defines a plane through the circumferential centerline of the tire body perpendicular to the axis of rotation thereof.

3. The method of making a tire according to claim 1, wherein said tire body parts are formed in one or more first-stage molds of a first curable elastomer composition and said tire body parts are cured sufficiently to enable their removal from said first-stage mold or molds and said tread is formed of a second curable elastomer composition which is cured to said parts, said parts and said tread being simultaneously further cured in said second-stage mold.

4. The method of making a tire according to claim 1, wherein said tire body parts each have a tread-receiving surface, each tire body part having molded therein at least one of a plurality of spaced-apart holes which extend substantially radially through said tread-receiving surface of said tire body, said holes being vents to the interior of said tire body during introduction of elastomer composition to form said tread, and providing means for mechanically securing said tread.

5. A method of making a tire according to claim 4, wherein said holes achieve their greatest cross-sectional area at a point distant from the radially outer surface of said tread-receiving surface.

6. The method of making a tire according to claim 1, wherein the tread-receiving surface of said tire body is provided with a plurality of first regions and second regions spaced apart about the circumference of said tire body, said first regions being closer to the axis of rotation of said tire body than said second regions.

7. A method of making a tire according to claim 1, wherein each tire body part is provided with an annular configured lip near its split line internal diameter for engagement with a complementary groove in a ring clamp for holding said parts together with their axes of rotation congruent.

8. The method of making a tire according to claim 1, wherein a first tire body part is provided with projections which mate with recesses provided in a second tire body part.

9. The method of making a tire according to claim 1, wherein a reinforcement is positioned in said second-stage mold prior to the introduction of elastomer composition to form said tread.

10. The method of making a tire according to claim 1, wherein said tread-forming elastomer composition flows into said cavity via a balanced runner system having a plurality of arcuate runners disposed circumferentially about the periphery of said mold, said runners being interconnected by a plurality of generally radial passages.

* * * * *